United States Patent Office 3,109,829
Patented Nov. 5, 1963

3,109,829
POLY ALPHA MONOOLEFINS STABILIZED WITH ALKYLATED TRISPHENOLIC ETHER
Delos E. Bown, Baytown, Tex., assignor, by mesne assignments, to Esso Research and Engineering Company, Elizabeth, N.J., a corporation of Delaware
No Drawing. Filed Apr. 4, 1961, Ser. No. 100,540
5 Claims. (Cl. 260—45.85)

The present invention is directed to a polyolefin composition. More particularly, the invention is concerned with a composition including polyolefins which are stable against heat and color degradation. In its more specific aspects, the invention is concerned with a composition of polyolefin, such as polypropylene, which does not deteriorate in molecular weight or exhibit discoloration.

The present invention may be briefly described as a compound illustrated by the structural formula:

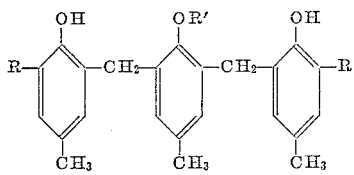

where R and R' are alkyl radicals containing 1 to 12 carbon atoms, and a composition containing the compound and a costabilizer, such as dilaurylthiodipropionate, dicetyl sulfide, bis(tetradecylmercapto)-p-xylylene, or bis-(octadecylmercapto)-p-xylylene, in minor amounts and a major amount of a polyolefin, such as polypropylene. A compound which has given satisfactory results in polypropylene is $\alpha^2, \alpha^6$-bis(3-t-butyl-5-methyl-2-hydroxyphenyl)-mesityl methyl ether.

In the practice of the present invention, the compound may be employed in an amount in the range from about 0.05 to about 1 percent by weight of the solid polymer. An amount in the range from about 0.2 to about 0.5 weight percent may be preferred.

The costabilizer may also be employed in an amount in the range from about 0.1 to about 1 percent by weight of the solid polymer with an amount in the range from about 0.2 to about 5 percent by weight preferred.

It has been found that certain polyolefin polymers, when exposed to oxygen and/or heat, will degrade and deteriorate, forming a color and losing molecular weight. In accordance with the present invention, the compound mentioned before with the costabilizer serves to prevent color loss and deterioration by loss of molecular weight due to exposure to oxidative conditions.

The polyolefin polymers in accordance with the present invention are polymers of olefins having 2 to 8 carbon atoms in the molecule and may suitably be exemplified by polyethylene, polypropylene, ethylene-propylene copolymers, ethylene-butene-1 copolymers, ethylene-pentene-1 copolymers, and the like, having molecular weights in the range from about 10,000 to about 1,000,000. These polymers are produced by polymerization of the corresponding olefins employing the Ziegler type polymerization catalyst which is obtained by at least partially reducing in solution in a diluent a halide of an amphoteric metal selected from groups IVB, VB, VIB, and VIII of the periodic system of elements (see, for example, the Henry D. Hubbard Periodic Chart of the Elements, 1947 ed., revised by W. F. Meegers; W. M. Welch Mfg. Co., Chicago, Ill.). Examples of suitable halides from which the catalyst is prepared are the halides of titanium, zirconium, hafnium, thorium, uranium, vanadium, columbium, tantalum, chromium, molybdenum, tungsten, and mixtures thereof. Exemplary of suitable compounds include titanium tetrachloride, titanium tetrabromide, zirconium tetrachloride, and the like.

In preparing catalysts suitable for use in forming the polymer treated in accordance with the present invention, the amphoteric metal halide is reduced in solution in a nonreactive, nonpolar organic diluent in any suitable manner, such as by means of chemical reaction with a suitable chemical compound having reducing properties, by irradiation, etc. This is done to reduce at least a portion, and preferably more than about 30 percent of the amphoteric metal halide, to a lower valence state. The product of the reduction step, comprising the diluent and the at least partially reduced amphoteric metal halide, is employed as the medium in which olefin polymerization is effected.

The diluent to be employed should be a nonreactive, nonpolar organic medium in which the amphoteric metal halide starting material is soluble to an extent at least sufficient to provide an 0.1 weight percent solution of amphoteric metal halide starting material. Thus, for example, in preparing the polymerization medium, an 0.1 to 10 weight percent solution of amphoteric metal halide in the diluent may be employed.

Among the diluents that may be employed are saturated aliphatic hydrocarbons, preferably containing from about 5 to 10 carbon atoms per molecule. Specific examples of such diluents include pentane, hexane, heptane, octane, decane, nonane, and mixtures thereof, or other saturated petroleum hydrocarbons. A particularly desirable diluent is n-heptane. It will be understood that other hydrocarbon diluents may be used, such as aromatic diluents (benzene, xylene, etc.), halogenated aromatic hydrocarbons (monochlorobenzene, dichlorobenzene, etc.) gas oil distillate fractions obtained from the catalytic cracking of virgin gas oil feed stocks, diesel oil, etc. It will be understood that, if desired, mixtures of two or more compatible, miscible diluents may be employed. The diluent should be substantially completely free from oxygen, water and similar compounds of strong polarity which are reactive with the products obtained by reduction of the amphoteric metal halide.

The nonpolar organic liquid in which the slurry is formed may suitably be identical with the diluent in which the catalyst is formed for polymerizing the olefinic compounds.

The polymerization reaction is suitably conducted at a temperature in the range from about —60° to about 400° F., preferably at about room temperature. Higher temperatures may be employed, but are generally undesirable in that catalyst decomposition may be encountered. Subatmospheric pressures and pressures up to about 250 atmospheres may be employed in forming the polymer treated in accordance with the present invention. It is generally preferable to employ in the polymerization technique a comparatively low pressure, and specifically it is desirable to employ atmospheric pressure. Reaction times of about 60 minutes are required, although reaction time may vary within the range of about 10 minutes to about 24 hours.

As a result of subjecting the olefins of the type illustrated before to treatment with a catalyst of the nature described, olefin polymers are formed having the molecular weights recited which are essentially insoluble in the nonpolar organic liquid and form a slurry of polymerized olefins in the non-polar organic liquid. It is these polymers, after quenching to deactivate any catalyst and separation from the slurry, which are treated by adding the stable additives, in accordance with the present invention, since the polymer particles are in a finely divided state, have a high surface area, and rapidly adsorb oxygen.

In adding the $\alpha^2$, $\alpha^6$-bis (3-t-butyl-5-methyl-2-hydroxyphenyl) mesityl alkyl ether and the costabilizer to the polyolefin of the present invention, the additives may suitably be employed and incorporated in the polyolefin by forming a solution of the particular additives in a suitable solvent such as an aromatic hydrocarbon. The ether compound may suitably be added in any suitable solvent such as methanol, xylene, hexane, etc. while the costabilizer may suitably be employed in any suitable solvent such as methanol, xylene, hexane, etc. The two additives may be sprayed over the pellets or particles of polymers and the resulting mixture may then be extruded through a suitable extrusion device to cause the formation of a homogeneous mixture. While it is preferred to add the two additives to the polyolefin in a solution, they suitably may be added as such to the polymer particles and the resulting mixture subjected to milling or extrusion as desired to cause intimate admixture of the additives with the polymer composition to form a homogeneous mixture.

The composition of the present invention is quite important and useful in formation of products such as molded and extruded devices and articles, or the composition may be formed in films for use in wrapping foodstuffs and other articles, or the polymer composition may be extruded as a filament to be used in weaving and forming of cloths, fibers, and other similar materials.

In order to illustrate the invention further, reference is had to Table I, where compositions of polypropylene and the several components of the composition were made up. These compositions were submitted to thermal and oxidative conditions to determine the stabilizing effect of the various additives.

TABLE I

Thermal and Oxidative Stability of Polypropylene With Various Stabilizing Systems

| Sample No. | Stabilizer system | Wt. percent | Color of polymer pad | Oxidative stability, days [a] |
|---|---|---|---|---|
| 532 | Compound I | 0.2 | brown | 4 |
| 525 | Compound II | 0.2 | white | 2½ |
| 526 | DLTDP [b], Compound I | 0.3, 0.1 | light brown | 20 |
| 507 | DLTDP, Compound II | 0.3, 0.1 | white | 25 |
| 45 | DLTDP, Compound I | 0.5, 0.1 | light brown | 34 |
| 636 | DLTLP, Compound II | 0.5, 0.1 | white | 48 |
| 637 | Dicetyl Sulfide, Compound II | 0.3, 0.1 | do | >20 |
| 638 | Bis(tetradecylmercapto)-p-xylylene, Compound II | 0.3, 0.1 | do | >20 |

[a] 150° C., 4 cc. air/min.
[b] Dilaurylthiodipropionate.

In the foregoing table, compound I is the compound represented by the following structural formula:

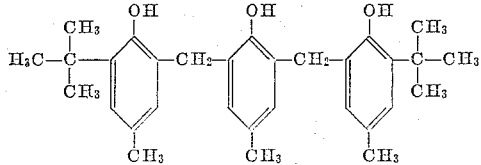

while compound II is $\alpha^2$, $\alpha^6$-bis(3-t-butyl-5-methyl-2-hydroxyphenyl)-mesityl methyl ether of the present invention.

It will be apparent from the data in Table I that neither compound I nor compound II alone in polypropylene is satisfactory as to oxidative stability although compound II does not discolor a pad or sample of the polypropylene. Compound I in combination with the costabilizer, dilaurylthiodipropionate, does not confer as great an oxidative stability to the composition as does compound II with the dilaurylthiodipropionate. It is to be especially noted that the compositions of the present invention not only are stable but also are not affected detrimentally by developing an undesirable brown coloration. It is also noteworthy that larger amounts of compound II increased the oxidative stability to a greater extent than the same amount of compound I. Finally, it is to be noted that several costabilizers have been found to be effective; and these are only by way of illustration, and not limitation, since there exists a large number of such costabilizers which would also be effective.

The compounds of the present invention may suitably be prepared by reacting a compound such as:

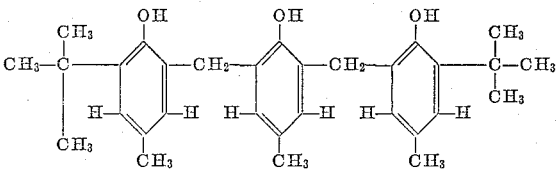

in the form of its sodium salt with an alkyl sulfate such as dimethyl sulfate in solution in a suitable solvent such as toluene to obtain a reaction product which precipitates from the reaction medium and may be recovered by filtration of the mixture followed by washing with petroleum ether and recrystallization as may be desired.

For example, $\alpha^2$, $\alpha^6$-bis(3-t-butyl-5-methyl-2-hydroxyphenyl)-mesitol, compound I, is prepared as follows:

2,6-dimethylol-4-methylphenol is prepared according to the method of Beaver et al. (see D. J. Beaver, R. S. Shumard, and P. J. Stoffel, Journal American Chemical Society, vol. 75, p. 5579, 1953);

Then, 98.4 g. (0.6 mole) 2-t-butyl-4-methylphenol is placed in a flask equipped for stirring, a condenser, a trap for removing condensed water, and a nitrogen blanket. The flask is worked sufficient to liquefy the phenol;

Then, while stirring vigorously 16.8 g. (0.1 mole) of the 2,6-dimethylol-4-methylphenol is added in one portion followed by 4 ml. of concentrated HCl. The mixture is then heated to 125° C. and held for 36 hours while the water of the reaction is gradually removed. The mixture is cooled to room temperature; 100 ml. of n-heptane is added and the mixture allowed to stand. Colorless crystals come down and these are filtered, washed with petroleum ether, and dried. There is obtained 9.7 g. (21% yield) of compound I, M.P. 174°–175° C.

The $\alpha^2$, $\alpha^6$-bis(3-t-butyl-5-methyl-2-hydroxyphenyl)-mesityl methyl ether, compound II, is then prepared as follows:

6.9 g. (0.015 mole) of the compound I (M.P. 174°–175° C.) is dissolved in 50 ml. of dry toluene and placed in a flask equipped for stirring, a condenser, and an inert gas blanket. Then 0.35 g. (0.015 mole) of sodium is added and the mixture heated until the sodium has reacted. 2 g. of dimethyl sulfate in 10 ml. toluene is added dropwise. A white precipitate appears; it is filtered and washed repeatedly with petroleum ether and then dried. There is obtained 2.8 g. (40% yield) of compound II, M.P. 202°–203° C.

The nature and objects of the present invention having been completely described and illustrated, what we wish to claim as new and useful and secure by Letters Patent is:

1. A composition containing a solid polymer of an alpha monoolefin having 2 to 8 carbon atoms in the molecule and a molecular weight in the range from about 10,000 to about 1,000,000 and a stabilizing amount of the compound:

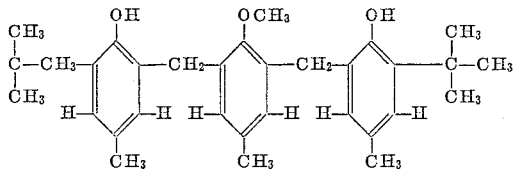

2. A composition in accordance with claim 2 containing dilaurylthiodipropionate as a costabilizer.

3. A composition in accordance with claim 1 in which the solid polymer is polypropylene.

4. A composition in accordance with claim 1 in which the amount of the compound and the dilaurylthiodipropionate each is within the range from about 0.05 to 1.0% by weight of said composition.

5. The compound:

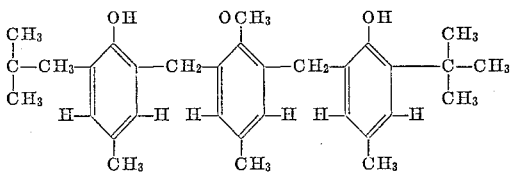

References Cited in the file of this patent

FOREIGN PATENTS

| | | |
|---|---|---|
| 208,596 | Australia | Oct. 27, 1955 |
| 845,608 | Great Britain | Aug. 24, 1960 |